United States Patent [19]
Cizek et al.

[11] Patent Number: 5,335,353
[45] Date of Patent: Aug. 2, 1994

[54] METHOD FOR PROCESSING SUBSEQUENTLY RECEIVED COMMUNICATIONS

[75] Inventors: Paul J. Cizek, Palatine; Arthur D. Chrapkowski, Hoffman Estates, both of Ill.

[73] Assignee: Motorola, Inc., Schaumburg, Ill.

[21] Appl. No.: 841,700

[22] Filed: Feb. 26, 1992

[51] Int. Cl.$^5$ ............................................... H04B 7/14
[52] U.S. Cl. ...................... 455/17; 455/34.1; 455/56.1; 455/58.2
[58] Field of Search ............... 455/17, 34.1, 34.2, 455/53.1, 54.1, 54.2, 58.2, 56.1; 379/58

[56] References Cited

U.S. PATENT DOCUMENTS

| | | | |
|---|---|---|---|
| 4,102,597 | 3/1977 | Lynk, Jr. et al. | 455/34.1 |
| 4,554,677 | 11/1985 | Smith et al. | 455/58.2 |
| 4,573,207 | 2/1986 | Smith et al. | 455/58.2 |

Primary Examiner—Edward F. Urban
Assistant Examiner—Andrew Faile
Attorney, Agent, or Firm—Timothy W. Markison

[57] ABSTRACT

In a communication system network, a central controller can more efficiently respond to communication requests in the following manner. Upon receiving a request for a multi-communication system communication by a communication unit in a first communication group, the central controller determines that at least one of the communication systems of the multi-communication system request does not have an available communication resource in it, producing a non-accessible system. Having determined that at least one communication system is non-accessible, the central controller determines the average wait period for a resource to become available in each of the non-accessible communication systems. When a communication request for a second communication group is subsequently received and requests allocation of communication resources in accessible communication systems only, the central controller processes the communication request for the second communication group when the communication request will be processed substantially within the average wait period.

6 Claims, 2 Drawing Sheets

METHOD FOR PROCESSING SUBSEQUENTLY RECEIVED COMMUNICATIONS

FIELD OF THE INVENTION

This invention relates generally to communication system networks and in particular to a method that allows a central controller to process subsequently received communication while another communication is pending.

BACKGROUND OF THE INVENTION

Communication system networks are known to comprise a plurality of communication systems and a central controller. Each of the communication systems comprises a plurality of communication units, a limited number of communication resources that are transceived via a limited number of repeaters, and a communication resource allocator that allocates the communication resources among the plurality of communication units. The communication units, which may be mobile radios, portable radios, and/or portable radio/telephones, are typically arranged into communication groups and are generally located throughout the communication system network. Of the communication resources, which may be TDM slot locations, frequency carriers, pairs of frequency carriers, or any other RF transmission means, one is selected to function as a control channel. The control channel transceives operational information between the communication units and the central controller via the communication resource allocators.

As is known, a communication unit may establish a communication with other communication units within the communication system network by transmitting an inbound signalling word (ISW) to the central controller via the communication resource allocator of the communication system that the communication unit is located in. Upon receiving the request, the central controller processes it and, if the request is valid, the central controller allocates a communication resource in each of the communication systems that have a communication unit of the targeted talk group in it. The communication systems, which may also be communication sites, are coupled to and controlled by the central controller. If a communication system, or site, loses contact with the central controller, the communication system, or site, operates as an independent communication system but only for communication units that are located within its coverage area.

As is also known, when a communication is requested by a communication unit for its particular communication group (first communication group), the communication unit transmits an ISW requesting allocation of a communication resource for that group. Upon receipt of the requesting ISW, the central controller determines whether a communication resource is available in all the communication systems, or sites, for the first communication group. In more advanced communication systems networks, the central controller determines which communication systems have a communication unit of the first communication group registered in it and whether these communication systems have an available communication resource. In either network, the central controller will not place the call until all communication systems, or sites, have an available resource. Thus, the requesting call waits in a queue until all the communication systems have a resource available.

When the above mentioned call, the first call, is waiting for communication resources to become available, subsequent requests for communications may be received. If the subsequent request is for a second communication group and the second call does not overlap the first call, i.e. the second call will be placed in entirely different communication systems than the first call, the second call can be processed. However, if the second call has one communication system that overlaps the first call, the second call is placed in the queue and will not be placed until after the first call is processed. The second call is placed in the queue even if all of the communication systems that the second call will be placed in have an available communication resource. Therefore, a need exists for a method that will allow the central controller to efficiently process subsequently receive communication requests when other communication requests are pending.

SUMMARY OF THE INVNETION

These needs and others are substantially met by the method for processing subsequently received communications disclosed herein. In a network of communication systems that comprises a plurality of communication systems, a central controller that interfaces with a plurality of communication systems, and at least one operator station, wherein each communication system includes a plurality of communication units that are arranged into communication groups, a limited number of communication resources that are transceived via a limited number of repeaters, and a communication resource allocator that allocates via the central controller a limited number of communication resources among the plurality of communication units, the following discusses a method for processing subsequently received communications.

The process begins when a communication unit of a first communication group transmits a request for a multi-communication system communication to the central controller. Upon receiving the request, the central controller time stamps the request and subsequently determines that at least one of the communication systems in the multi-communication system communication request presently does not have an available communication resource such that at least one of the communication systems is not accessible. For each communication system that has an available communication resource, i.e. an accessible communication system, the central controller reserves the communication resource for the first communication request.

For the at least one non-accessible communication system, the central controller determines the average wait period for a communication resource to become available. When a communication request for a second communication group is subsequently received within at least one of the accessible communication systems, the central controller will process the communication request for the second communication group when the communication request will be processed substantially within the average wait period.

DESCRIPTION OF A PREFERRED EMBODIMENT

Figure 1:
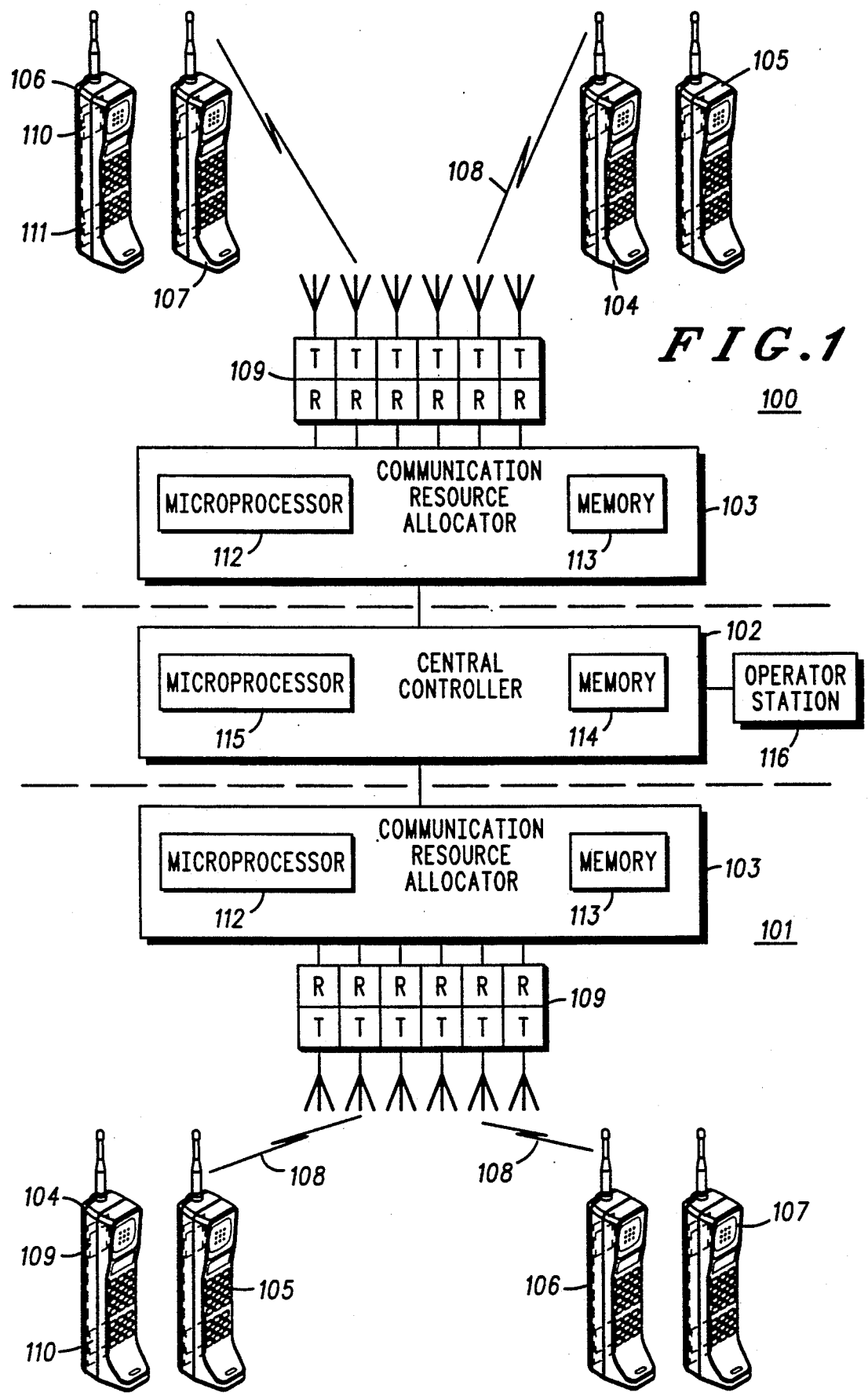
FIG. 1 illustrates a communication system network that may incorporate the present invention.

FIG. 1 illustrates a networked trunking communication system comprising a plurality of communication systems (two shown) 100 and 101, a central controller 102, and an operator station 116. Each of a plurality of communication systems 100 and 101 comprises a communication resource allocator 103, a limited number of communication units (four shown) 104–107, a limited number of communication resources 108, and a limited number of repeaters 109. Each of the communication units 104–107 comprises at least one microprocessor 110 and a digital storage memory device 111 which may be RAM, ROM or any other type of means for storing digital information. The communication units 104–107 may be configured into communication groups, wherein two communication units may form a communication group. Communication units of a communication group may reside in any communication systems throughout the network. The communication resource allocator 103 comprises at least one microprocessor 112 and digital memory 113, wherein the digital memory may be RAM, ROM or any other type of means for storing digital information. The communication resources 108 are transceived between the communication units 104–107, and the communication resource allocator 103, within a communication system and the central controller 102, via the repeaters 109, wherein the repeaters may comprise base stations. Of the communication resources, one is selected to function as the control channel which transceives trunking communication system control data between the communication resource allocator 103 and the communication units 104–107.

The networked trunking communication system of FIG.1 supports communications between communication units by allocating communication resources to requesting communication units. Resources for a given request may be allocated within a communication system or between multiple communication systems (hence the term networked), by the central controller. Due to the limited number of communication resources within each communication system, more requests for allocation of communication resources may be received than can be processed, i.e. the networked trunking communication system becomes busy. When the central controller cannot process a request for communication upon receiving it, the central controller stores the request in a queue until communication resources become available in each communication system that the communication request was for. The manner in which the central controller processes communication requests, stores the requests when the network is busy, and storing subsequently received requests is known in the art, thus no further discussion will be presented.

Figure 2:
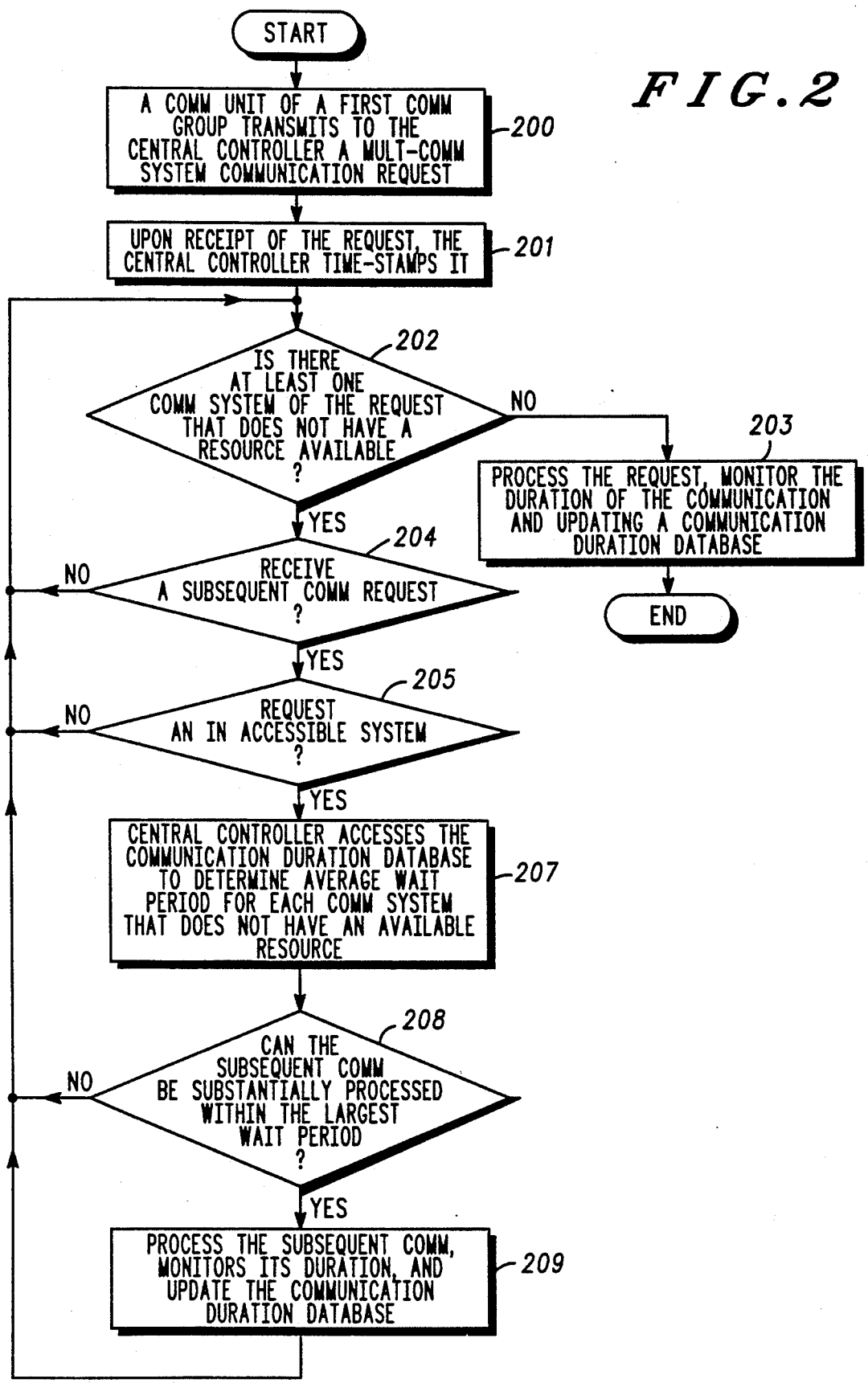
FIG. 2 illustrates a logic diagram that may be used to implement the present invention.

In order to eleviate some of the network busyness, the method of FIG. 2 can be employed into the networked trunking communication system. The procedure of FIG. 2 may be programmed into the microprocessor 115 of the central controller. In addition, the communication units, the communication resource allocators, and the central controller are also programmed with respective algorithms to transceive requests for resources; such algorithms are known in the art. The procedure begins at step 200 wherein a communication unit of a first communication group transmits a multi-communication system communication request to the central controller. The multi-communication system communication request is a standard request for allocation of a communication resource in each communication system that has a communication unit of the first communication group registered in it.

Once the central controller receives the request, it time stamps the request and stores the time stamping information in memory 201. The time stamping information comprises the time of day that the request was received by the central controller. Subsequently, the central controller determines whether all of the communication systems of the multi-communication system request have an available communication resource 202. If a communication resource is available in each of the communication systems, the central controller processes the request 203; as mentioned, the processing of multi-communication system communication requests is known in the art. While the request is being processed, the central controller will monitor the duration of the communication such that it can update a communication duration database for the first communication group. The communication duration database contains, for each communication group, the average duration of a communication which is updated after every communication. For example, in communication group 1, the database contains an average duration of 15 seconds per call based on 4 calls being placed, the duration of the 5th call will be monitored and, when it is completed, will be averaged into the average duration.

When at least one communication system of the multi-communication system request does not have an available communication resource 202, the central controller stores the request. A communication system that does not have an available resource is considered to be temporarily non-accessible, while a communication system that does have an available communication resource is considered to be temporarily accessible. Having stored the request, the central controller determines whether a subsequent communication request has been received 204. If a subsequent communication request was not received, the central controller waits for a communication resource to become available 202, or a subsequent request to be received 204.

When a subsequent communication request is received 204, the central controller determines whether the subsequent communication request requires communication resources from at least one of the non-accessible communication systems 205. If the subsequent request is requesting a resource in one of the non-accessible communication systems, the subsequent request is stored in the queue and the procedure proceeds at step 202. If the central controller determines that the subsequent communication request requires communication resources only within accessible communication systems 205, the central controller accesses the communication duration database and retrieves the average communication duration for each communication group actively using a communication resource within each of the non-accessible communication systems 206.

The central controller also retrieves the communication start time for each communication group actively using a communication resource within each non-accessible communication systems and computes the difference between current time of day and start time for each active communication group and stores the difference for each communication group as the current communication duration 206. Further, in step 206, the central controller retrieves the average communication duration from the communication duration database for each communication group actively using a communication resource within each of the non-accessible communication systems, computes the difference between current communication duration and average communication duration for each communication group respectively, and stores the difference as average wait time for each communication group respectively.

After computing the wait periods for each of the non-accessible communication systems, the central controller retrieves the average communication duration for the subsequent communication request and compares the average wait time for each communication system required for the subsequent communication 207. If the average duration of the subsequent communication request is substantially equal to or less than the average wait time for each communication system required 208, the central controller processes the subsequent communication request, stores the communication request along with the time of day as an indication of start time of the communication for the subsequent communication request processed 209. Further, in step 209, when the communication is terminated, the central controller stores the duration of the call and updates the duration database for the communication group that requested the subsequent call 209. If the central controller determines that the average duration of the subsequent request is not substantially equal to or less than the average wait time of each of the required communication systems, the central controller will store the subsequent communication request in the queue and proceed to step 202.

As an example of the above process, assume that communication group 1 has placed a call and the central controller determines that the call is to be placed in communication systems 1, 2, 3, 4, 7, 8, and 10. The central controller also determines that communication systems 2, and 4 do not presently have a communication resource available, thus they are presently non-accessible. In the other accessible communication systems, the central reserves a communication resource for communication group 1 and determines how long it will be before a resource becomes available. When a communication unit of another communication group transmits request for communication and the request requires allocation of communication resources in only accessible communication systems, i.e. systems 3, 7, 8, and 10, while the request for the first communication group is still pending, the central controller determines the average wait period in each of the non-accessible communication systems by retrieving the average duration of a communication for each communication group that is accessing a communication resource.

Assume, in communication system 2, communication groups 2, 4, and 6 have access to the system's communication resources and have an average call duration of 10, 12, and 15 seconds respectively. In communication system 4, communication groups 5 and 8 have access to the system'communication resources and have an average call duration of 13 and 16 seconds respectively. Having obtained this information, the central controller determines how much longer each communication group will be accessing their allocated communication resource. This is done by subtracting how long the call has been active from the average call duration. In communication system 2, groups 2, 4, and 6 have 4, 6, and 8 as their computed average wait period. Thus in 4 seconds, a communication resource will become available in communication system 2. In communication system 4, groups 5 and 8 have 10 and 11 seconds as their computed average wait period, thus a communication resource will become available in communication system 4 in 10 seconds.

If the average duration of a call for the another communication group is less than 10 seconds, the call for the another communication group will be processed while the first call is pending because it can be substantially performed while the call for the first communication group is waiting for a communication resource to become available in system 4. If, on the other hand, the average duration of a call for the another communication group is more than 10 seconds, the call will not be processes until the first call has been serviced.

We claim:

1. In a network of communication systems that comprises a plurality of communication systems, a central controller that interfaces with the plurality of communication systems and at least one operator station, wherein each communication system includes a plurality of communication units that are arranged into communication groups, a limited number of communication resources that are transceived via a limited number of repeaters, and a communication resource allocator that allocates via the central controller the limited number of communication resources among the plurality of communication units, a method for processing subsequently received communications, the method comprises the steps of:

a) transmitting, by a communication unit of a first communication group, a request for a multi-communication system communication to the central controller;
   b) time-stamping, by the central controller, the request for the multi-communication system communication when the request is received;
   c) determining, by the central controller, that at least one of the communication systems in the multi-communication system communication presently does not have an available communication resource to produce at least one non-accessible communication system;
   d) for each communication system in the multi-communication system communication that has an available communication resource, reserving, by the central controller, the available communication resource to produce an accessible communication system;
   e) determining, by the central controller, an average wait period for a communication resource to become available in each of the at least one non-accessible communication system; and
   f) when a communication request for a second communication group is subsequently received within at least one of the accessible communication systems, processing the communication request for the second communication group when the communication request will be processed substantially within the average wait period.

2. In the method of claim 1, the determination of the average wait period of step (e) further comprises, for each communication within a communication group, storing duration of the communication and updating a communication duration database wherein the communication duration database maintains an average duration of a communication for each communication group.

3. The method of claim 2 further comprises, for each communication resource in the at least one non-accessible communication system, determining a differential of time between the time-stamp for each communication group allocated one of the communication resources in the at least one non-accessible communication system and the time-stamp of the request for a multi-communication system communication.

4. The method of claim 3 further comprises determining the average wait period for each communication resource in the at least one non-accessible communication system by subtracting said differential from the average duration of a communication.

5. The method of claim 4 further comprises, when at least two communication systems in the multi-communication system communication do not presently have an available communication resource, determining the average wait period as the greatest average wait period of the at least two communication systems.

6. In the method of claim 4, the processing of the second communication in step (f) further comprises comparing an average duration of the second communication with the average wait period and processing the second communication when the average duration of the second communication is approximately less than the average wait period.

* * * * *